United States Patent
Bahadur et al.

(10) Patent No.: US 7,957,330 B1
(45) Date of Patent: Jun. 7, 2011

(54) FAILSAFE MANAGEMENT OF PERIODIC COMMUNICATIONS DURING SYSTEM UPGRADE FOR A NETWORK DEVICE

(75) Inventors: Nitin Bahadur, Santa Clara, CA (US); David M. Katz, Santa Cruz, CA (US); Nischal Sheth, Los Altos, CA (US); Rahul Aggarwal, San Francisco, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 761 days.

(21) Appl. No.: 11/945,809

(22) Filed: Nov. 27, 2007

(51) Int. Cl.
*H04B 1/44* (2006.01)

(52) U.S. Cl. ........... 370/282; 370/216; 701/66; 438/439

(58) Field of Classification Search .................. 370/216, 370/236; 438/439; 701/66
See application file for complete search history.

(56) References Cited

U.S. PATENT DOCUMENTS

| | | | |
|---|---|---|---|
| 5,848,128 A | 12/1998 | Frey | |
| 6,304,546 B1* | 10/2001 | Natarajan et al. | 370/216 |
| 6,453,430 B1 | 9/2002 | Singh et al. | |
| 6,542,934 B1 | 4/2003 | Bader et al. | |
| 6,751,188 B1 | 6/2004 | Medved et al. | |
| 6,910,148 B1 | 6/2005 | Ho et al. | |
| 7,055,063 B2 | 5/2006 | Leymann et al. | |
| 7,130,304 B1 | 10/2006 | Aggarwal | |
| 7,206,836 B2 | 4/2007 | Dinker et al. | |
| 7,236,453 B2 | 6/2007 | Visser et al. | |
| 7,359,377 B1 | 4/2008 | Kompella et al. | |
| 7,362,700 B2 | 4/2008 | Frick et al. | |
| 7,406,030 B1 | 7/2008 | Rijsman | |
| 7,406,035 B2 | 7/2008 | Harvey et al. | |
| 7,506,194 B2 | 3/2009 | Appanna et al. | |
| 7,508,772 B1 | 3/2009 | Ward et al. | |
| 2007/0207591 A1* | 9/2007 | Rahman et al. | 438/439 |
| 2007/0263836 A1* | 11/2007 | Huang | 379/265.01 |
| 2008/0004782 A1* | 1/2008 | Kobayashi et al. | 701/66 |

OTHER PUBLICATIONS

Office Action for U.S. Appl. No. 11/857,076 dated Dec. 3, 2009, 10 pgs.
Response to Office Action for U.S. Appl. No. 11/857,076 dated Mar. 3, 2010, 6 pgs.
Chen et al., "Dynamic Capability for BGP-4," Network Working Group, Internet Draft, http://tools.ietf.org/id/draft-ietf-idr-dynamic-cap-03.txt, Dec. 2002, 6 pgs.
Sangli et al., "Graceful Restart Mechanism for BGP," Network Working Group, Internet Draft, http://tools.ietf.org/html/draft-ietf-idr-restart-06, Jan. 2003, 10 pgs.

(Continued)

*Primary Examiner* — Robert W Wilson
*Assistant Examiner* — Mohamed Kamara
(74) *Attorney, Agent, or Firm* — Shumaker & Sieffert, P.A.

(57) ABSTRACT

The invention is directed to techniques for failsafe management of periodic communications between network devices. A first network device, for example, establishes with a second network device a first response interval by which the first device responds to a message received from the second device. Prior to commencing a software upgrade, the first device determines whether the event requires an interval of time during which the first device cannot respond to the message within the established first response interval. Based on the determination and prior to commencing the upgrade, the first device establishes with the second device a second response interval that equals or exceeds the first response interval. Upon completion of the event, the first device establishes with the second device a third response interval. The first network device therefore may automatically adjust response intervals to accommodate upgrades that may cause unnecessary thrashing.

25 Claims, 5 Drawing Sheets

OTHER PUBLICATIONS

U.S. Appl. No. 10/647,839, filed Aug. 25, 2003, entitled "Dynamic Renegotiation of Graceful Restart Time to Avoid Double-Failure Traffic Loss," to Bruno Rijsman.

Office Action for U.S. Appl. No. 11/857,076 dated Jun. 2, 2010, 9 pp.

Response to Office Action for U.S. Appl. No. 11/857,076 dated Sep. 2, 2010, 7 pp.

* cited by examiner

| VERSION 40A | DIAGNOSTIC 40B | STATE 40C | MODES 40D | DETECTION TIMER MULTIPLIER 40E | LENGTH 40F |
|---|---|---|---|---|---|
| MY DESCRIMINATOR 40G ||||||
| YOUR DESCRIMINATOR 40H ||||||
| DESIRED MINIMUM TRANSFER INTERVAL 40I ||||||
| REQUIRED MINIMUM RECEIVE INTERVAL 40J ||||||
| REQUIRED MINIMUM ECHO RECEIVE INTERVAL 40K ||||||

FIG. 3

FAILSAFE MANAGEMENT OF PERIODIC COMMUNICATIONS DURING SYSTEM UPGRADE FOR A NETWORK DEVICE

TECHNICAL FIELD

The invention relates to computer networks and more particularly, to managing communications between network devices within computer networks.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes available routes through the network. Each route defines a path between two locations on the network. Upon receiving an incoming packet, the router examines information within the packet and forwards the packet in accordance with the routing information.

In order to maintain an accurate representation of a network, routers maintain control-plane peering sessions through which they exchange routing or link state information that reflects the current topology of the network. In addition, these routers typically send periodic packets to each other via the session to communicate the state of the devices. These periodic packets are sometimes referred to as "keepalives" or "hellos." For example, a first router may send a packet to a second router every five seconds to verify that the router is still operational. The first router may require or otherwise expect the second router to respond to the packet in a certain amount of time. When a response packet is not received in the allotted time frame, the first router expecting the message may conclude a network failure has occurred, such as failure of the second router or failure of the link connecting the two routers. Consequently, the first router may update its routing information to exclude that particular link, and may issue a number of routing protocol update messages to neighboring routers indicating the topology change.

However, a number of non-failure conditions may prevent the second router from responding to the first router within the required periodic response time. Failure to respond due to these and other conditions can result in significant network thrashing and other problems. As one example, the computing resources of the second router may be consumed due to heavy network traffic loads. In other words, with the increased amount of network traffic on the Internet, for example, many conventional routers have become so busy performing other functions, such as route resolution, that the response time to periodic packets is not sufficient. Furthermore, during certain procedures, such as software upgrades or patches, the router may not be able to respond to the periodic packets while it switches from a primary to a secondary or backup routing engine. If the time during which it cannot respond exceeds the allotted time the second router will wait for a response, the first router will signal to the second that it has failed even though the failure is most likely only temporary in these circumstances.

For example, a router may undergo a system software upgrade that causes a switch from a primary routing engine to a secondary routing engine requiring a significant period of time, e.g., five seconds. This time period for the switchover may exceed an allowable response time to a periodic packet received from a peer routing device. By the time the router has switched to the backup routing engine and therefore is able to respond to the periodic packet, the neighboring router may already mistakenly interpret that the router or link has failed. Consequently, the neighboring router may update its routing information to exclude the "failed" router. Furthermore, the neighboring router may send update messages to its neighboring routers indicating the failure, causing its neighboring routers to perform route resolution in similar fashion. Shortly thereafter, the "failed" router may have performed the switch and the backup routing engine (acting as the new primary routing engine) is able to send its neighboring router a response packet indicating that it is operational while a software upgrade of the primary routing engine is performed. As a result, the neighboring router again updates its routing information to include the router and sends another update message to its neighbors, causing the neighboring routers to once again perform route resolution. The unnecessary route resolution and update messages cause the network routers to thrash, creating significant network delays.

SUMMARY

In general, the invention is directed to techniques for failsafe management of periodic communications between network devices during an upgrade for system software on one of the devices. More specifically, when establishing a peering session, a first network device initially negotiates with a second network device a first response interval by which the first network device responds to messages received from the second network device. The negotiation of the first response interval occurs in accordance with a protocol, such as the bidirectional forwarding detection (BFD) protocol. In the event a software upgrade is initiated that will cause a switchover event from a primary to a backup controller within the first network device, the first network device proactively automatically and dynamically lengthens the response interval by negotiating a second response interval to accommodate the software upgrade and avoid network thrashing. Once the switchover has occurred successfully, the backup controller of the first network device may negotiates a third response interval (e.g., a short interval the same as the initial first response interval) to resume fast detection of broken links.

For example, a first network device negotiates with a second network device in accordance with a protocol a first response interval by which the first network device need respond to a message sent by the second network device also in accordance with the protocol, such as the BFD protocol. The first network device automatically detects initiation of a software upgrade within a primary controller included within the first network device. The first network device may automatically detect the initiation by monitoring commands issued by an administrator or an automated script. Prior to commencing the software upgrade, the first network device may dynamically compute a predicted upgrade time to determine whether the predicted upgrade time exceeds or equals the first response interval.

The first network device may dynamically compute the predicted upgrade based on a number of factors. As one example, the first network device may dynamically analyze the size of the software upgrade and set the predicted upgrade time based on this size. As another example, in instances where the first network device comprises a primary and a secondary controller, e.g., respective active and backup routing engines, the first network device may estimate the time necessary for switchover to the secondary controller. The estimated switchover time may be preconfigured by an administrator or may be set based on measurements taken from previous switchovers.

Prior to commencing the software upgrade, the first network device determines whether the predicted upgrade time exceeds the first response interval, and if so, negotiates with the second network device in accordance with the protocol a second response interval such that the second response interval equals or exceeds the predicted upgrade time. After initiating the software upgrade and possibly upon completion of the switchover, the first network device negotiating with the second network device in accordance with the protocol a third response interval such that the third response interval is shorter than the second response interval. Through automatic detection of the initiation of a software upgrade and dynamic computation of prediction interval, the first network device automatically and dynamically lengthens the response interval to accommodate the software upgrade. Automatic detection frees the administrator from having to perform this function. Dynamic computation possibly allows for a tailored response to software upgrades which avoids excessive response intervals where no monitoring of the link is conducted. Thus, the techniques may more effectively monitor links during software upgrades.

In one embodiment, a method comprising negotiating with a first network device in accordance with a protocol a first response interval by which a second network device need respond to a message sent by the first network device also in accordance with the protocol and automatically detecting initiation of a software upgrade within a primary controller of the second network device. The method further comprising, prior to commencing the software upgrade, dynamically computing a predicted upgrade time with the second network device to determine whether the predicted upgrade time exceeds or equals the first response interval, and based on the determination and prior to commencing the software upgrade, negotiating with the first network device in accordance with the protocol a second response interval such that the second response interval equals or exceeds the predicted upgrade time. The method further comprising, after initiating the software upgrade, negotiating with the first network device in accordance with the protocol a third response interval such that the third response interval is shorter than the second response interval.

In another embodiment, a network device comprising a control unit that negotiates with another network device in accordance with a protocol a first response interval by which the network device need respond to a message sent by the other network device also in accordance with the protocol and a management module that (i) automatically detects initiation of a software upgrade within the network device, and (ii) prior to commencing the software upgrade, dynamically computes a predicted upgrade time to determine whether the predicted upgrade time exceeds or equals the first response interval. The control unit, based on the determination and prior to commencing the software upgrade, further negotiates with the other network device in accordance with the protocol a second response interval such that the second response interval equals or exceeds the predicted upgrade time, and after initiating the software upgrade, negotiates with the first network device in accordance with the protocol a third response interval such that the third response interval is shorter than the second response interval.

In another embodiment, the invention is directed to a computer-readable medium containing instructions. The instructions cause a programmable processor to negotiate with a first network device in accordance with a bidirectional forwarding detection (BFD) protocol a first response interval by which a second network device need respond to a message sent by the first network device also in accordance with the protocol, automatically detect initiation of a software upgrade within a controller of the second network device, and prior to commencing the software upgrade, dynamically compute a predicted upgrade time with the second network device to determine whether the predicted upgrade time exceeds or equals the first response interval. The instruction further cause the programmable processor to, based on the determination and prior to commencing the software upgrade, negotiate with the first network device in accordance with the protocol a second response interval such that the second response interval equals or exceeds the predicted upgrade time, and after initiating the software upgrade, negotiate with the first network device in accordance with the protocol a third response interval such that the third response interval is shorter than the second response interval.

In another embodiment, a network device comprises a control unit that negotiates with another network device in accordance with a protocol a first response interval by which the network device need respond to a message sent by the other network device also in accordance with the protocol, and a management module that (i) automatically detects initiation of an event processing function within the network device, wherein the event processing function comprises an event that disrupts the transfer of the message such that the second network device does not receive the message within the first response interval, and (ii) prior to commencing the software upgrade, dynamically computes a predicted upgrade time to determine whether the predicted upgrade time exceeds or equals the first response interval. The control unit of the network device further negotiates, based on the determination and prior to commencing the software upgrade, with the other network device in accordance with the protocol a second response interval such that the second response interval equals or exceeds the predicted upgrade time, and after initiating the software upgrade, negotiates with the first network device in accordance with the protocol a third response interval such that the third response interval is shorter than the second response interval.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 3 is a diagram illustrating an exemplary control message sent by a router to a peer router to negotiate a particular response interval in accordance with the principles of the invention.

DETAILED DESCRIPTION

Figure 1:
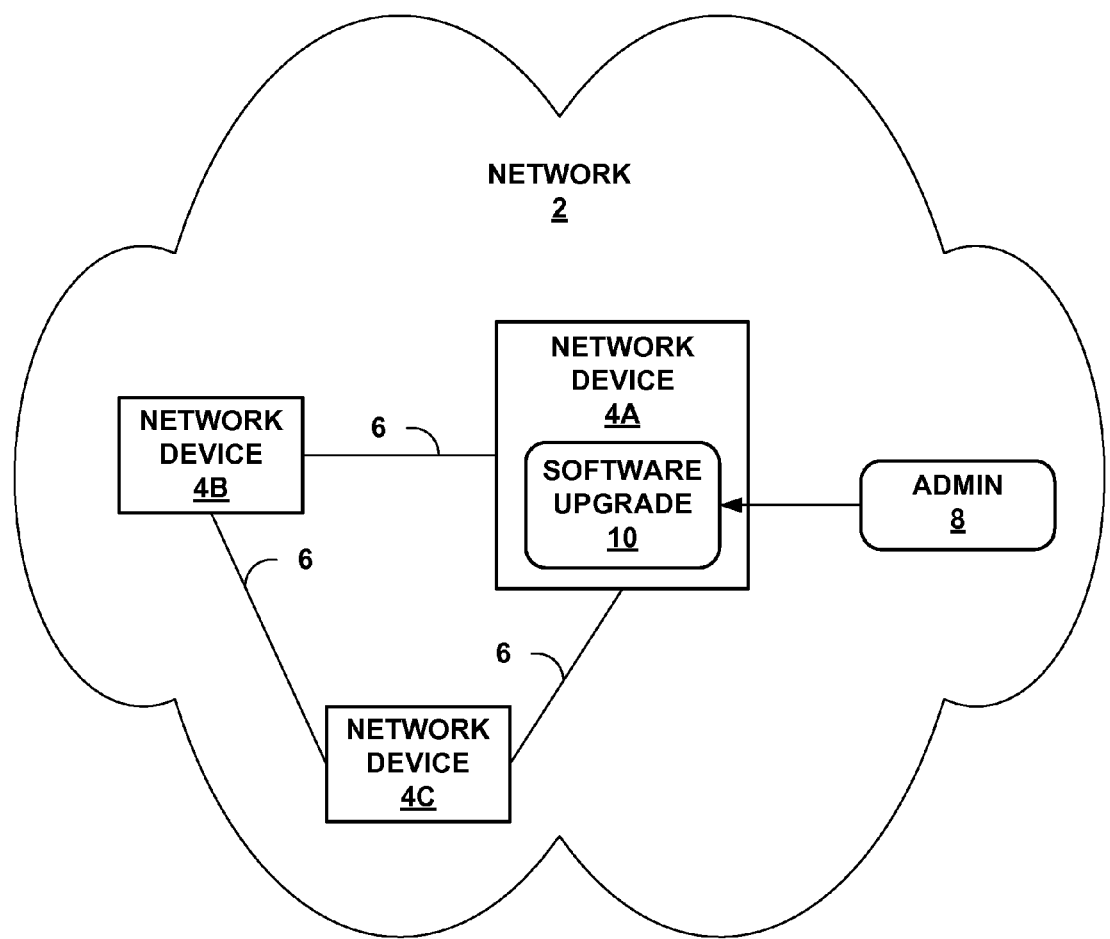
FIG. 1 is a block diagram illustrating an example computer network comprising a plurality of network devices coupled by links.

FIG. 1 is a block diagram illustrating an example computer network 2 comprising network devices 4A-4C coupled by links 6. Network devices 4A-4C ("network devices 4") communicate data within computer network 2, and may include routers, hubs, switches and any other type of network device capable of communicating in accordance with a network protocol.

Network devices 4 communicate in accordance with one or more control-plane protocols to maintain accurate representation of the topology of network 2. For example, as routers, network devices 4 maintain peering sessions with each other and exchange routing information for routes or links within network 2 in accordance with a routing protocol. Example protocols include the Border Gateway Protocol (BGP) distance vector routing protocol and the Open Shortest Path First (OSPF) and Intermediate System-to-Intermediate System (IS-IS) link state routing protocols.

In addition to exchanging session messages to convey network topology information, network devices 4 periodically send status inquiries (e.g., send "periodic packets" or "periodic data") to one another in order to monitor the state of the other devices. That is, by sending periodic inquiries and expecting timely responses, network devices 4 detect any failures in communicating data between each other, either as a result of failure of one or more of network devices 4 or the communication links 6 between them. Upon detecting such a failure, the detecting network device 4 updates its internal representations of the topology of network 2 and outputs session messages to the other network devices 4 to inform them of the changes.

Typically, the length of time between which network devices 4 transmit the periodic data or messages to one another correlates directly to the speed at which network devices 4 detect any failure in communications between one another and thus update their respective representation of the topology of network 2 to respond to the failure. For this reason, network devices 4 may be configured to expect a response to a periodic inquiry in a relatively short length of time, e.g., a few seconds or less.

One exemplary protocol, referred to as the bidirectional forwarding detection (BFD) protocol, is commonly used between routing devices in order for each router to closely monitor the state (e.g., health) of the other routing device. For examples, routers that exchange routing information via the OSPF or ISIS routing protocols may establish BFD session for sending and responding to status inquiries in the form of Hello packets or Echo packets, either asynchronously or when needed (e.g., as in the BFD Demand Mode). In either case, the BFD protocol provides a very short interval of time between which network devices 4 must respond to periodic messages, and thus may facilitate the quicker detection of failures by network devices 4.

Although described herein in reference to the BFD protocol, the techniques may apply to any protocol allowing for periodic messages for inquiring as to the status of a peering device. Further, the techniques may be applicable to network devices 4 that use these periodic communications for media access control (MAC) layer protocols, such as the frame relay LMI, point-to-point (PPP) protocol. Moreover, the techniques further include instances where network devices 4 employ the BFD protocol in conjunction with any of the above protocols, as well as, protocols not contemplated herein. In these instances, network devices 4 may employ the BFD protocol for detecting failures and the other protocol for other routing functions, such as route resolution.

In the example of FIG. 1, network devices 4 exchange periodic messages in accordance with the BFD protocol. The BFD protocol enables each of network devices 4 to negotiate a response interval for each BFD session. In other words, network device 4A may negotiate a first BFD session with network device 4B, and network devices 4A, 4B may agree to a 0.5 second response interval. Meanwhile, network device 4A may negotiate a second BFD session with network device 4C, and network devices 4A, 4C may agree to a 0.8 second response interval. The response interval indicates the length of time by which a first network device of an associated BFD session, e.g., network device 4A, has to respond to a message sent by the second network device of the associated BFD session, e.g., network device 4B, before the second network device 4B determines a failure has occurred.

A response interval may also be negotiated relative to a particular network device. That is, the response interval may vary for each network device 4 of the BFD session. For example, the response interval for network device 4A to respond to a periodic message sent by network device 4B may be 0.5 seconds, while the response interval for network device 4B to respond to a periodic message sent by network device 4A may be 1.0 seconds. This notion of relative response intervals explains the "bidirectional" or "B" of the "BFD" protocol, as the periodic messages can be controlled in each direction.

Once the first response interval is negotiated, for example, between network devices 4A, 4B, network devices 4A, 4B respond in accordance with the BFD protocol to periodic messages sent by network device 4B, 4A within their respective response intervals. For exemplary purposes, the first response interval is assumed to be 0.5 seconds. While responding to these periodic messages, an administrator 8 ("admin 8" in FIG. 1) may load a software upgrade 10 onto one of network devices 4A, 4B, e.g., network device 4A in FIG. 1.

Admin 8 may next initiate the installation of software upgrade 10 to a primary controller (not shown in FIG. 1) of network device 4A. Software upgrade 10 may comprise a software "patch," which generally updates one or more components of an application (e.g., a dynamically link library (DLL) in the context of the Microsoft Windows™ operating system), or a software install, which completely replaces the application for an upgraded application. In conventional network devices, initiating a software upgrade similar to software upgrade 10 may lead to thrashing within network 2, as network device 4A would fail to respond to the periodic messages sent by network device 4B due to the application of software upgrade 10.

However, network device 4A in accordance with the principles of the invention performs failsafe management of periodic communications to automatically and dynamically lengthen the response interval to accommodate the application of software upgrade 10, and thereby prevent thrashing within network 2. To perform failsafe management, network device 4A automatically detects the initiation of software upgrade 10. Network device 4A may automatically detect the initiation by monitoring commands input by admin 8 or, if initiated by an automated script instead of admin 8, by monitoring commands specified by the automated script.

Prior to commencing the software upgrade within the primary controller, network device 4A next dynamically computes a predicted upgrade time to determine whether the predicted upgrade time exceeds or equals the first response interval. Network device 4A may compute this predicted upgrade time in a number of ways. In one embodiment, network device 4A may compute the predicted upgrade time based on the size (in bytes) of software upgrade 10. In another embodiment, network device 4A may include not only a primary controller but a secondary controller, and network device 4A may initiate software upgrade 10 within the secondary controller prior to initiating software upgrade 10 within the primary controller. Based on the time necessary to apply software upgrade 10 to the secondary controller, network device 4A may compute the predicted upgrade time for applying software upgrade 10 to the primary controller.

In yet another embodiment, network device 4A may also include both the primary and secondary controllers, however, in this embodiment, network device 4A may compute the predicted upgrade time based on an estimate of the amount of time required to switch control of network device 4A from the primary controller to the secondary controller. Network device 4A may use this estimated switchover time because the secondary controller may, upon assuming control of network device 4A, respond to the messages, thereby resuming routing functionality more quickly, as network device 4A does not have to wait until the application of software upgrade 10 to the primary controller is complete. The estimated switchover time may be configured by admin 8 or an automated script or be based on measurements taken from previous switchovers. In still another embodiment, network device 4A may compute the predicted upgrade time based on a preconfigured value, such as a value entered by admin 8. For exemplary purposes, it is assumed that network device 4A computes a predicted upgrade time of 2.9 seconds.

Based on the predicted upgrade time and prior to commencing software upgrade 10, network device 4A negotiates with network device 4B in accordance with the BFD protocol a second response interval such that the second response interval equals or exceeds the predicted upgrade time, e.g., 3.0 seconds. This second response interval may be negotiated such that the BFD session maintained between network devices 4A, 4B need not be torn down. In other words, network device 4A may transmit a message via the already present BFD session to negotiate the second response interval. Alternatively, network device 4A may tear down the existing BFD session and initiate a new BFD session during which network device 4A negotiates the second response interval. Generally, network device 4A employs the former alternative as it avoids tearing down the existing BFD session. Moreover, when tearing down the BFD session, link 6 between network devices 4A, 4B may not be monitored, and thus network devices 4A, 4B may fail to detect an error during this down time. Thus, network devices 4A, 4B typically avoid tearing down BFD sessions to maintain constant monitoring of links 6.

After initiating software upgrade 10, network device 4A negotiates, in one of the above described ways, with network device 4B in accordance with the BFD protocol a third response interval such that the third response interval is shorter than the second response interval, e.g., 0.9 seconds. In some embodiments, network device 4A renegotiates the first response interval. In this manner, network device 4A may prevent network device 4B from declaring a failure to network device 4C and subsequently, within 2.9 seconds, declaring to network device 4C that network device 4A is again operational, thereby avoiding thrashing within network 2.

Figure 2A:
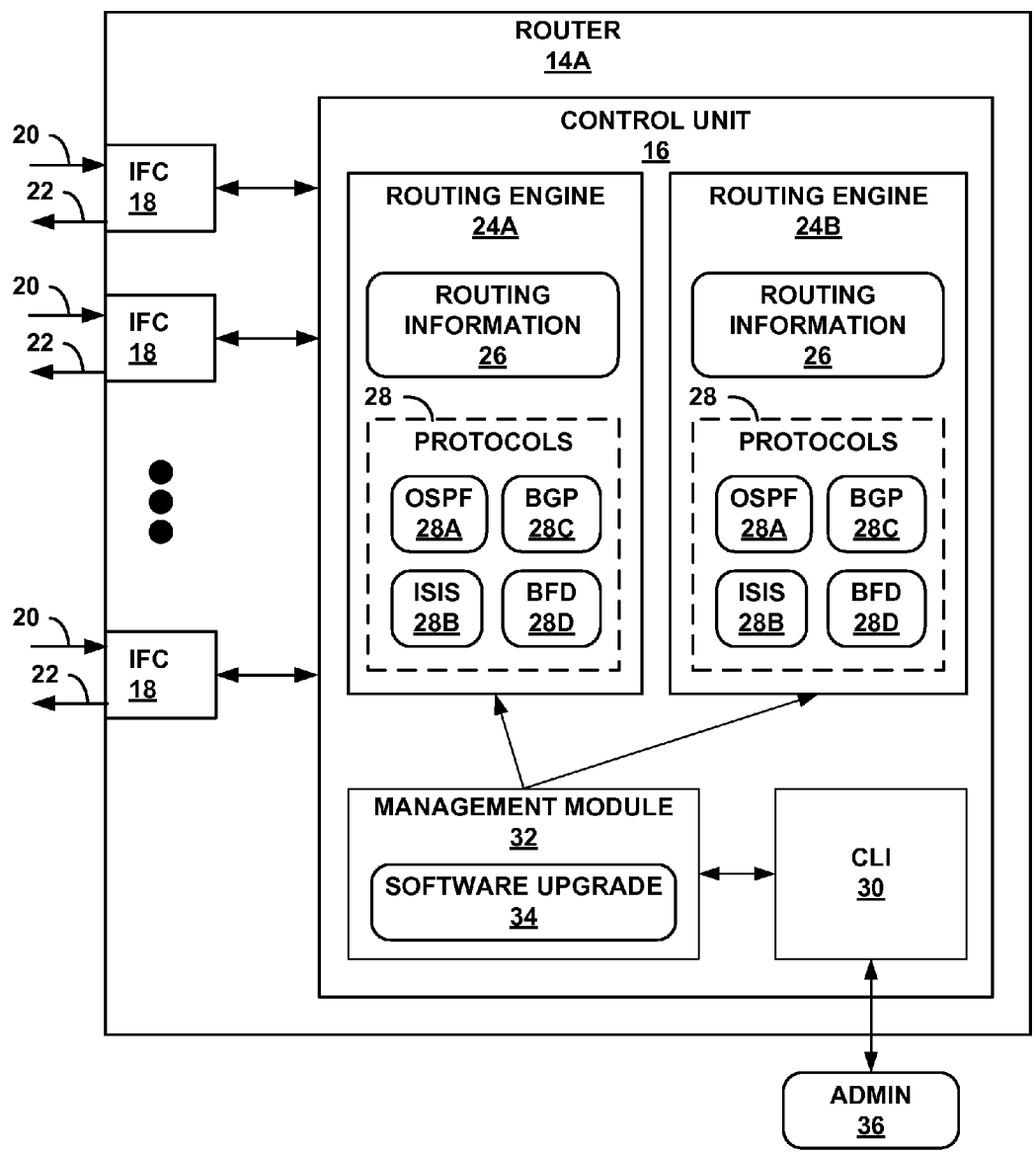
FIGS. 2A-2B are block diagrams illustrating example routers that provides failsafe management of periodic messages during system software upgrade in accordance with the principles of the invention.
Figure 2B:
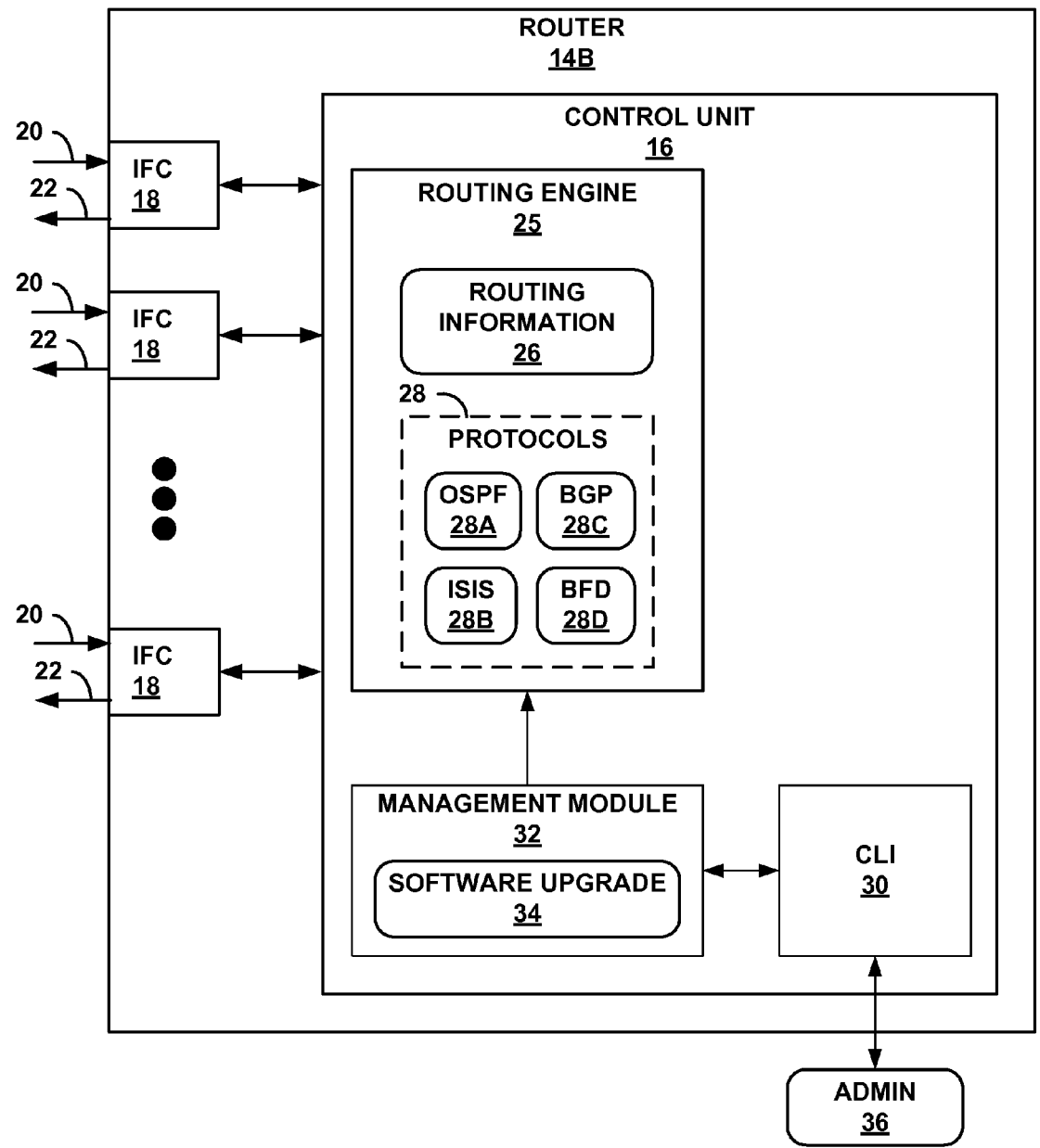

FIGS. 2A-2B are block diagrams each illustrating example routers 14A, 14B that implement the failsafe management techniques described herein. FIG. 2A is a block diagram illustrating an example router 14A comprising two routing engines 24A, 24B that cooperate in order to provide failsafe management of periodic messages during a system software upgrade in accordance with the principles of the invention. FIG. 2B is a block diagram illustrating an example router 14B comprising a single routing engine 25 that singly provides failsafe management of periodic messages during a system software upgrade in accordance with the principles of the invention.

As shown in FIG. 2A, Router 14A comprises a control unit 16 and one or more interface cards 18 ("IFCs 18") that receive and transmit the periodic messages, as well as, other data and/or messages via respective network links 20, 22. Control unit 16 further includes routing engines 24A, 24B ("routing engines 24") that provide an operating environment for communication protocols 28. Routing engines 24 therefore may include one or more processors that execute software instructions stored to a computer-readable medium, such as a disk drive, optical drive, Flash memory or any other type of volatile or non-volatile memory, that cause a programmable processor, such as control unit 16, to perform the failsafe management of periodic communications as described herein. Alternatively, routing engines 24 may comprise dedicated hardware, such as an integrated circuit, for performing the techniques described herein.

In some embodiments, one of routing engines 24 operates as an active routing engine or more generally a primary controller, while the other one of routing engines 24 operates as a backup routing engine or more generally a secondary controller. The active one of routing engines 24 may be responsible for forwarding the data arriving via links 20 to other network devices within or coupled to the network via links 22. The backup one of routing engines 24 may be responsible for resuming the forwarding activity of the active one of routing engines 24 should the active one require maintenance, malfunction, or stop forwarding packets for either a short or long period of time. For ease of illustration, it is assumed below that the active one of routing engines 24 is routing engine 24A and the backup one of routing engines 24 is routing engine 24B.

Generally, routing engines 24 are responsible for maintain and updating respective routing information 26. Routing engines 24B may also synchronize its routing information 26 to that routing information 26 of routing engine 24A so that in the event of a failure in routing engine 24A, routing engine 24B may quickly resume performance of routing engine 24A's routing responsibilities. Thus, both of routing engines 24 may maintain substantially similar routing information 26. A detailed description of exemplary techniques for synchronizing state information between dual control planes of a router is provided in co-pending application Ser. No. 10/678, 280, filed Oct. 3, 2003, entitled "Synchronizing State Information Between Control Units," by named inventors R. Balakrishna et al., the entire contents of which are hereby incorporated by reference as if fully set forth herein.

Each of routing engines 24 may further include protocols 28, and again each of protocols 28 may be substantially similar to each other so that routing engine 24B may quickly resume performance of routing engines 24A's routing responsibilities. In the context of protocols 28, routing engine 24B typically maintains similar tables or other data structures as that maintained by routing engine 24A for storing protocol state information relevant to routing engine 24A's routing responsibilities. Thus, routing engines 24 may maintain substantially similar protocols 28 to one another as well as associated protocol information.

As shown in FIG. 2A, each of protocols 28 include an OSPF protocol 28A ("OSPF 28A"), an ISIS protocol 28B ("ISIS 28B"), a border gateway protocol 28C ("BGP 28C"), and a BFD protocol ("BFD 28D"). As discussed above, routing engines 24 may employ BFD 28D in conjunction with one or more other protocols, such as one or more of OSPF 28A, ISIS 28B, and BGP 28C. Although shown as comprising multiple protocols 28A-28C, only one of protocols 28A-28C need be employed for routing engines 24 to properly manage routing information 26. Thus, the invention should not be limited strictly to the exemplary embodiment shown in FIG. 2A.

As further shown in FIG. 2A, router 14A also includes a command line interface 30 ("CLI 30") and a management module 32. CLI 30 serves as a daemon process that listens for commands from one or more users or automated software agents. Although described herein with respect to CLI 30, the techniques may allow for users to enter commands via any other type of interface, such as a user interface or a graphical user interface. Management module 32 may comprise a software module executing within control unit 16, a hardware module included within control unit 16 or a combination thereof. Management module 32 further includes a software upgrade 34, which represents a software patch or module that management module 32 may apply to upgrade the functionality of routing engines 24. While shown in FIG. 2A as presenting an interface for uploading software upgrade 34 to management module 32, CLI 30 may give way to direct communication between a user and management module 32.

Initially, a user, such as an administrator 36 ("admin 36"), may interact with CLI 30 to initiate uploading system software upgrade 34 to management module 32 for installation on router 14A. Admin 36 may perform this upload by issuing a command to CLI 30, whereupon CLI 30 receives software upgrade 34 and transmits software upgrade 34 to management module 32. Admin 36 may further enter a command to cause management module 32 to apply software upgrade 34 to routing engines 24. Upon receiving this command, management module 32 may first apply software upgrade 34 to routing engine 24B, as application of a software upgrade, such as software upgrade 34, typically requires a temporary halt of all routing activity on the one of routing engines 24 targeted for the upgrade. Because of this temporary halt, router 14A upgrades backup routing engine 24B, switches routing responsibility from active routing engine 24A to upgraded routing engine 24B, and upgrades the now, backup routing engine 24A.

Prior to this upgrade process, routing engine 24A negotiates with another router in accordance with BFD 30D a first response interval, e.g., 0.5 seconds. Because of this short response interval, routing engine 24A may quickly identify a failure in communications with the other router, and therefore quickly update its topology of the network, such as network 2 of FIG. 1, as reflected in its routing information 26. However, this short first response interval may not provide adequate time to both respond to a message from the other routing engine and switch routing responsibility from routing engine 24A to routing engine 24B. That is, the interval required to perform the switching event may comprise a longer interval of time than the first response interval. Thus, management module 32 automatically detects initiation of an upgrade via, for example, a command entered by one of admin 36, an automated script, or any other conceivable manner by which commands to initiate upgrade 34 may be entered. Next, management module 32 dynamically computes a predicted time to complete the upgrade so as to determine whether the interval of time to apply software upgrade 34 to primary routing engine 24A will exceed the first response interval.

Management module 32 may dynamically compute the predicted upgrade time in any number of ways. As one example, management module 32 may compute a predicted upgrade time based on a size in bytes of the current software upgrade 34 to be applied. Management module 32 may compute the predicted upgrade time by recording upgrade times for previous software upgrades of different sizes and then determining an algebraic relationship upgrade time and size of the upgrade, e.g., by linear interpolation.

As another example, management module 32 may monitor the time required to apply software upgrade 34 to routing engine 24B, and assuming upgrade 34 was successfully applied, management module 32 may set the predicted upgrade time to this monitored interval of time. As yet another example, admin 36 or some other user may interact with management module 32 to pre-program a table defining approximate lengths of time for specific activities or possibly even a table comprising formulas for computing a length of time for specific activities. If formulas are used, one such formula may allow management module 32 to compute the predicted upgrade time based on the file size of software upgrade 34. In still other embodiments, management module 32 may in a sense be "hardwired" to determine that application of software upgrade 34 exceeds the first response interval.

Regardless of the method used to compute the predicted upgrade time, management module 32 compares the predicted upgrade time to the first response interval. Management module 32 may, however, not have direct access to the first response interval because routing engine 24A may not be required to inform management module 32 of this information. Management module 32 may therefore issue an instruction or message to routing engine 24 requesting the first response interval from routing engine 24A. Upon receiving a response to this instruction or in instances where management module 32 is informed of this first response interval, management module 32 compares the predicted upgrade time to the first response interval.

If the predicted upgrade time does not exceed the first response interval, management module 32 may not cause routing engine 24A to negotiate a second response interval, as management module 32 may apply software upgrade 34 with enough time left over to respond to any periodic messages that routing engine 24A receives. However, if the predicted upgrade time exceeds or equals the first response interval, management module 32 may issue an instruction or message to routing engine 24A that causes routing engine 24A to negotiate a second response interval such that the second response interval exceeds or equals the predicted upgrade time. Within the instruction, for example, management module 32 may specify the predicted upgrade time and require that routing engine 24A negotiate the second upgrade interface such that it equals or exceeds the specified predicted upgrade time. After negotiating the second response interval, routing engine 24A may respond to the instruction or message issued by management module 32 stating that the second response interval has been negotiated. Management module 32, upon receiving this response, may issue another instruction or message that causes routing engine 24A to switch control to routing engine 24B.

As mentioned above, routing engine 24B generally replicates state information recorded on routing engine 24A. In particular, routing engine 24B may replicate state changes to protocols 28. Thus, routing engine 24B, upon receiving control from routing engine 24A, may resume the routing responsibilities last active under routing engine 24A's control and may access its BFD 28D to determine the previous or first response interval. Alternatively, management module 32 may instruct routing engine 24B to renegotiate the first response interval. In any event, routing engine 24B, now the active one of routing engines 24 as the switching event is complete, renegotiates the first response interval with the other router according to BFD 28D. If during the second interval, the other router sent a message, either of routing engines 24A or 24B may respond to that message prior to renegotiating the first response interval. That is, if control has not completely transferred to routing engine 24B, for example, routing engine 24A may respond to the message. If control has transferred successfully between routing engines 24, routing engine 24B may respond.

During switchover, routing engine 24B may automatically determine that either a shorter or longer response interval is required and may not renegotiate the first response interval but some other third response interval. Routing engine 24B may base this determination on the state of the link, the average congestion across the link, the amount of data flowing through IFCs 18, or any other data that may affect the ability of routing engine 24B to respond to the periodic messages within a given response interval.

As shown in FIG. 2B, routing engine 14 only executes a single routing engine 25 within control unit 16. In all other aspects, router 14B is substantially similar to router 14A of FIG. 2A in that both include substantially similar control units 16, IFCs 18, routing information 26, protocols 28, CLIs 30, management modules 32, and software upgrades 34.

In the embodiment shown in FIG. 2B, routing engine 25 may negotiate the first response interval, receive indication of an event, such as software upgrade 34, negotiate the second response interval, perform the system upgrade, and, upon completion of the system upgrade, negotiate the third response interval without necessarily switching to a second routing engine. Instead of switching to a second routing engine, e.g., routing engine 24B, management module 32 may, prior to commencing upgrade 34, dynamically compute a predicted upgrade time with the second network device to determine whether the predicted upgrade time exceeds or equals the first response interval determine a time. The predicted upgrade time, in this instance, however may not equal the time to switch between routing engines 24, but rather equals the time to successfully apply upgrade 34 to routing engine 25 plus the time required to respond to any messages that may have queued within router 14B. Furthermore, as routing engine 25 typically generally halts routing functionality during application of upgrade 34, routing engine 25 may respond to any messages prior to negotiating the second interval, as it will be unable to respond to these while undergoing the upgrade.

While described herein with respect to FIG. 2B, the techniques described herein include the notion of a single routing engine 25 executing within control unit 16. The invention therefore should not be limited strictly to router 14A of FIG. 2A. Moreover, even router 14A may implement the techniques described in reference to router 14B. That is, in some instances, such as when the second routing engine has failed and only single routing engine 24A is operational, routine engine 24A may perform the techniques as described in reference to routing engine 25. Thus, the invention should further include this aspect and not be limited strictly to the separate and distinct descriptions of routers 14A, 14B, even though the remainder of the disclosure describes the techniques relative to a two routing engine implementation.

While described herein with respect to software upgrades, such as software upgrade 10 and software upgrades 34, the failsafe management techniques may not be so strictly limited and may apply to any event processing function that may disrupt periodic communication, such as required by the BFD protocol, and thereby cause network thrashing. An example event processing function may include not only the software upgrade event described herein but also a loading event, whereby control unit 16, for example, utilizes all of its available processing power performing complicated tasks, such as route resolution, and is unable to adequately respond to periodic messages. Management module 32 may determine an occurrence of this loading event by monitoring the available processing power of control unit 16, and upon reaching a designated or dynamically determined level, indicate that routing engine 25, for example, negotiate a second response interval to accommodate the lack of available processing power within control unit 16. In this manner, the failsafe management techniques may apply to events unrelated to software upgrades so that routing engines may accommodate these other events and thereby avoid any such event that may lead to network thrashing.

FIG. 3 is a diagram illustrating an exemplary control message 38 sent by router 14A to a peer router to negotiate a particular response interval in accordance with the principles of the invention. In this example, control message 38 complies with the BFD protocol, such as BFD 28D of FIG. 2A, so that no changes need be implemented to the protocols executing on the receiving router. Control message 38 therefore may be referred to below as "BFD control message 38." BFD control message 38 may further be formulated as a packet and receive the moniker of "BFD control packet 38." Again, although described in reference to the BFD protocol and BFD control message 38 in particular, the techniques may apply equally to any protocol allowing for periodic messages and dynamic configuration of response intervals.

As shown in FIG. 3, BFD control message 38 comprises 6 rows of 32 bits (0-31 across the top of BFD control message 38 in FIG. 3). BFD control message 38 further comprises fields 40A-40K ("fields 40"), where each of fields 40 may specify information relevant to specifying a response interval. Version field 40A, for example, specifies the version number of the protocol, which may enable the receiving router to determine whether it supports BFD control message 38. Diagnostic field 40B specifies a coded reason for the last session state change to states of "Down" or "AdminDown." State field 40C specifies the current BFD session state as seen by the router transmitting BFD control message 38. Typical, BFD session states comprises "AdminDown," "Down," "Init," and "Up." Modes field 40D comprises a number of bits, where each bit specifies a particular BFD session mode. For example, one bit of modes field 40D may specify whether the session requires authentication, e.g., whether the session is in "authentication mode."

Detection timer multiplier field 40E specifies a value that when multiplied by the value specified within desired minimum transfer interval 40I provides the detection time for the router transmitting BFD control message 38 in "asynchronous mode." Length field 40F specifies the length of BFD control message 38 in bytes. My discriminator field 40G specifies a unique, nonzero discriminator value generated by the router transmitting BFD control message 38. My discriminator field 40G may be used to demultiplex multiple BFD sessions between the same set of receiving and transmitting routers. Your discriminator field 40H specifies the discriminator received from the corresponding router of the particular BFD session. Your discriminator field 40H may specify a zero value, if the discriminator of received from the corresponding router is unknown by the transmitting router.

Desired minimum transfer interval field 40I specifies the minimum interval, in microseconds, that the local system would like to use when transmitting BFD control message 38 and subsequent BFD control messages. Required minimum receive interval field 40J specifies the minimum interval, in microseconds, between received BFD control messages that the router transmitting BFD control message 38 is capable of supporting. If the transmitting router sets required minimum receive interval field 40J to zero, the transmitting router does not want the remote or receiving router to send any periodic BFD control messages. Required minimum echo receive interval field 40K specifies the minimum interval, in microseconds, between received BFD echo messages that the transmitting router is capable of supporting. Specifying a zero to this field indicates that the transmitting router does not support the receipt of BFD echo packets.

A router, such as router 14A of FIG. 2A, may therefore generate and output BFD control message 38 under the direction of management module 32 to specify a particular response interval by which it will respond to a periodic BFD control message from a second router. In particular, management module 32 controls the dual routing engines 24A, 24B of router 14A to produce BFD control messages that specify, in desired minimum transfer interval field 40I, the above-described first response interval and each subsequent response interval, e.g., second and third response intervals so as to provide failsafe management of periodic communications when accommodating software upgrades.

Although described in reference to setting a particular response interval, router 14A may also specify an indefinite response interval by indicating within BFD control message 38 a change of state from "Up" or "Init" to "AdminDown." Router 14A may perform this state change by setting state field 40C to "AdminDown" for example while further setting diagnostic field 40B to explain the change of state. For example, diagnostic field 40B may indicate that the state change occurred because a result of admin 36's action, e.g., causing management module 32 to apply software upgrade 34 to active routing engine 24A. The state change from "Up" to "AdminDown" causes periodic messaging to temporarily halt until the state change returns to either of "Init" or "Up." In embodiments that implement this indefinite response interval, the router may not have to calculate a definite response interval, which may suit events that occur for unpredictable lengths of time. Thus, even when events are unpredictable, the techniques may dynamically adapt the response interval to accommodate the unpredictable nature of the events, and thereby further avoid network thrashing. For further information concerning the BFD protocol generally, BFD control message, and BFD control message fields, see the Internet Draft published by the Network Working Group of the Internet Engineering Task Force (IETF), titled "Bidirectional Forwarding Detection," written by D. Katz and D. Ward, and dated March, 2007, the entire contents of which are hereby incorporated by reference as if fully set forth herein.

Figure 4:
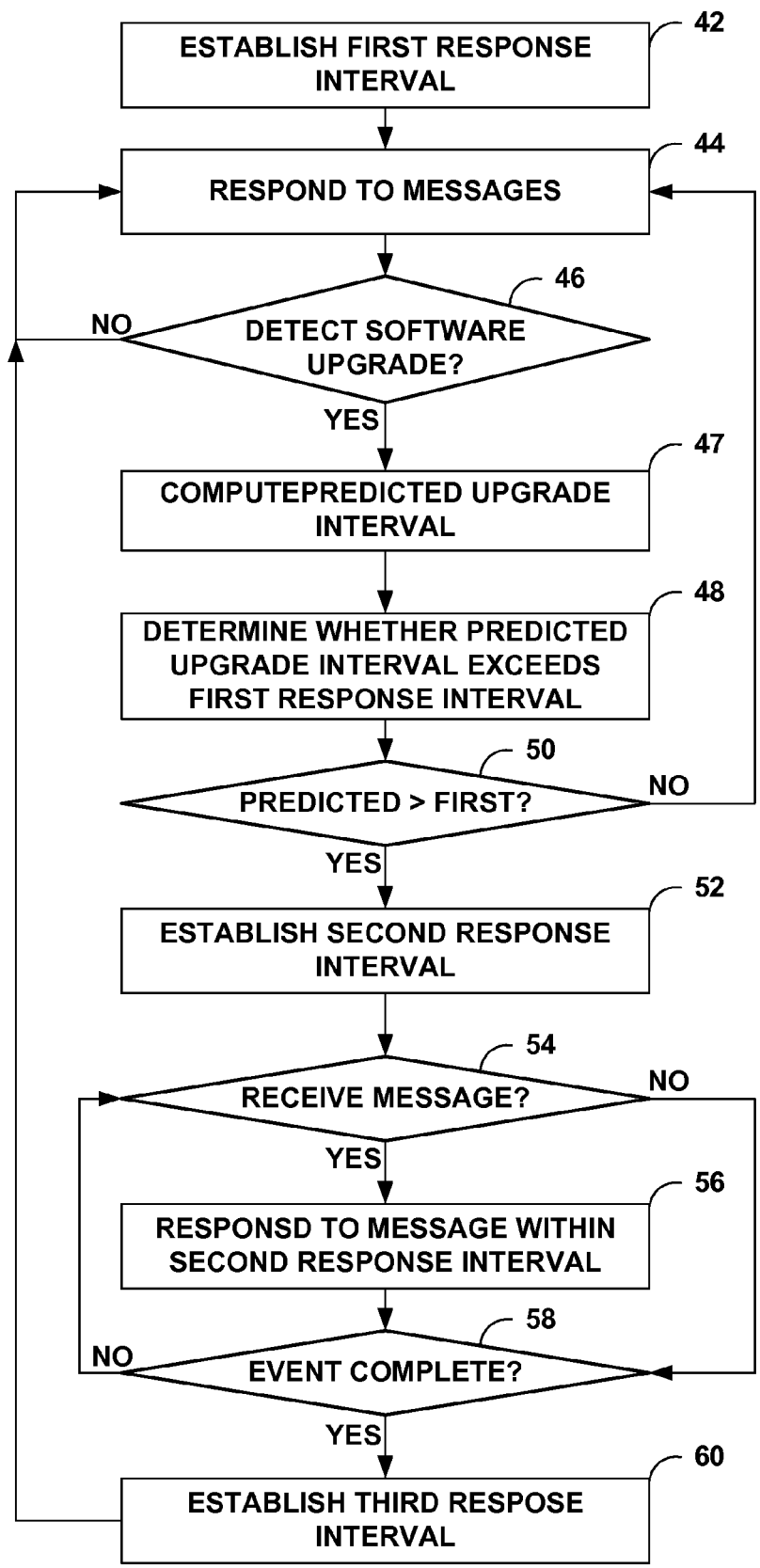
FIG. 4 is a flowchart illustrating exemplary operation of a network device in performing failsafe management of periodic communications in accordance with the principles of the invention.

FIG. 4 is a flowchart illustrating exemplary operation of a network device, such as router 14A of FIG. 2A, in performing failsafe management of periodic communications in accordance with the principles of the invention. Initially, routing engine 24A negotiates a first response interval with a second network device by, for example, transmitting a BFD control message that specifies the first response interval in desired minimum transfer interval field 40I, as shown in FIG. 3 (42). As router 14A receives subsequent periodic messages, routing engine 24A responds to those messages within the first response interval in accordance with BFD 28D (44).

At some point while responding to messages within the first response interval, routing engine 24A may receive an indication of a software upgrade, e.g., software upgrade 34 (46). For example, management module 32 may receive user input from CLI 30 indicating that a system software upgrade has been initiated. If management module 32, however, does not receive such an indication, routing engine 24A continues to respond to any messages within the first response interval in accordance with normal operation (44).

If management module 32 does receive such an indication, it next dynamically computes a predicted upgrade time, as described above, (47) and automatically determines whether the predicted length of time to complete the software upgrade on routing engine 24A, e.g., the predicted upgrade time, exceeds the first response interval, as described above (48). If the event interval does not exceed the first response interval, management module 32 does not issue any commands to routing engine 24A and the routing engine continues to respond to the periodic messages within the first response interval (50, 44).

However, if the predicted upgrade time exceeds the first response interval, management module 32 automatically outputs an instruction or message to routing engine 24A indicating that a system software upgrade is about to be initiated for the routing engine. In the message, management module 32 specifies the predicted upgrade time for completion of the software upgrade on routing engine 24A.

In response, routing engine 24A performs two functions. First, routing engine 24A negotiates a second response interval for the BFD session for each of its peering devices (e.g., with the second network device) by, for example, transmitting another BFD control message to the second network device (50, 52). The second BFD control message may indicate a second response interval either by specifying the second response interval in desired minimum transfer interval field 40I or by changing the state from "Up" to "AdminDown" within state field 40C, as described above in reference to specifying an indefinite response interval. Second, upon successfully negotiating the second response interval, routing engine 24A outputs an instruction or message to routing engine 24B to initiate a switch of control so that routing engine 24B takes over as the primary routing engine. Management module 32 may first issue an instruction or message to routing engine 24A to initiate the switch, which then issues the above described instruction to coordinate the switch of control, or management module 32 may initiate application of software upgrade 34 to routing engine 24A, which causes routing engine 24A to perform the switch.

In some cases, routing engine 24B may receive a periodic message before it can negotiate a shorter third response interval, e.g., during the switching event (54). If so, routing engine 24B responds to the periodic message within the second response interval currently specified for the BFD session (56). Regardless of whether a message is received, routing engine 24B may, upon resuming the routing responsibilities of routing engine 24A, determine the event to be complete and negotiate a third response interval (60). Typically, routing engine 24B renegotiates the first routing interval to shorten the period of time for failure detection back to the original amount; however, as described above, it may negotiate a third different interval if routing engine 24B so determines. If the switch of control is not complete, routing engine 24B may wait until it has completed (54, 58). Once completed, routing engine 24B may respond to messages within the third response interval (44).

Although described above with respect to a router 14A and various routing engines 24, the principles of the invention may be equally applicable to any network device, such as one of network devices 4 of FIG. 1. In these embodiments, the techniques described herein may be embodied as instructions stored to a computer readable medium or as dedicated hardware. The instructions may cause a programmable processor to perform or the dedicated hardware may perform the failsafe management of periodic communication techniques described above. Thus, various embodiments of the invention have been described. These and other embodiments are within the scope of the following claims.

The invention claimed is:

1. A method comprising:

executing a protocol by a first network device to negotiate with a second network device a first response interval by which the first network device need respond to a message sent by the second network device also in accordance with the protocol;

after executing the protocol by the first network device to negotiate with the second network device the first response interval, automatically detecting initiation of a software upgrade within a primary controller of the first network device;

prior to commencing the software upgrade, dynamically computing a predicted upgrade time to complete the software upgrade by the first network device to determine whether the predicted upgrade time exceeds or equals the first response interval;

based on the determination and prior to commencing the software upgrade, executing the protocol by the first network device to negotiate with the second network device a second response interval by which the first network device need respond to a message sent by the second network device such that the second response interval equals or exceeds the predicted upgrade time; and after initiating the software upgrade, executing the protocol by the first network device to negotiate with the second network device a third response interval by which the first network device need respond to a message sent by the second network device such that the third response interval is shorter than the second response interval.

2. The method of claim 1, wherein executing the protocol to negotiate with the second network device the second response interval includes executing the protocol to negotiate with the second network device an indefinite response interval.

3. The method of claim 2, wherein executing the protocol to negotiate the indefinite response interval comprises:

setting a state field within a control message to indicate an AdminDown state; and transmitting the control message to the first network device prior to commencing the software upgrade within the primary controller.

4. The method of claim 1, wherein the protocol comprises the bidirectional forwarding detection (BFD) protocol.

5. The method of claim 1, further comprising:

receiving with the first network device the message sent by the second network device in accordance with the protocol;

when the first response interval is negotiated, responding with the primary controller of the first network device to the message sent by the second network device within the first response interval in accordance with the protocol; and when the third response interval is negotiated, responding with a secondary controller of the first network device to the message sent by the second network device within the third response interval in accordance with the protocol.

6. The method of claim 1, wherein executing the protocol to negotiate the third response interval comprises executing the protocol to renegotiate with the second network device the first response interval.

7. The method of claim 1, further comprising, prior to commencing the software upgrade within the primary controller but after negotiating the second response interval, switching control of the first network device from the primary controller to a secondary controller of the first network device.

8. The method of claim 7, further comprising, prior to switching control of the first network device from the primary controller to the secondary controller of the first network device and prior to negotiating the second response interval, applying the software upgrade to the secondary controller of the first network device.

9. The method of claim 1, wherein dynamically computing the predicted upgrade time comprises dynamically computing a predicted upgrade time based on one or more of the following factors: (i) the size of the software upgrade and (ii) an estimated time necessary for the first network device to switch control from the primary controller to a secondary controller included within the first network device, wherein the estimated switchover time is either preconfigured by an administrator or set based on measurements taken from previous switchovers.

10. A network device comprising:

a control unit comprising one or more processors that execute a protocol to negotiate with another network device a first response interval by which the network device need respond to a message sent by the other network device in accordance with the same protocol, wherein the one or more processors further execute a management module that (i) after executing the protocol to negotiate with the second network device the first response interval, automatically detects initiation of a software upgrade within the network device, and (ii) prior to commencing the software upgrade, dynamically computes a predicted upgrade time to complete the software upgrade so as to determine whether the predicted upgrade time exceeds or equals the first response interval, wherein based on the determination and prior to commencing the software upgrade, the one or more processor executes the protocol to negotiate with the other network device a second response interval by which the second network device need respond to a message sent by the first network device such that the second response interval equals or exceeds the predicted upgrade time and, after initiating the software upgrade, negotiate with the first network device a third response interval such that the third response interval is shorter than the second response interval.

11. The network device of claim 10, wherein the processor executes the protocol to negotiates the second response interval as an indefinite response interval.

12. The network device of claim 11, wherein the processor further executes the protocol to set a state field within a control message to indicate an AdminDown state and transmit the control message to the first network device prior to commencing the software upgrade within the control unit so as to negotiate the second response interval as the indefinite response interval.

13. The network device of claim 10, wherein the protocol comprises the bidirectional forwarding detection (BFD) protocol.

14. The network device of claim 10,
further comprising an interface card that receives the message sent by the other network device in accordance with the protocol,
wherein the control unit comprises a primary controller and a secondary controller,
wherein, when the first response interval is negotiated, the primary controller responds to the message sent by the other network device within the first response interval in accordance with the protocol; and
wherein, when the third response interval is negotiated, the secondary controller responds to the message sent by the other network device within the third response interval in accordance with the protocol.

15. The network device of claim 10, wherein the one or more processors execute the protocol to renegotiate the third response interval as the first response interval.

16. The network device of claim 10, wherein the control unit includes a primary controller and a secondary controller, wherein, prior to commencing the software upgrade within the primary controller but after negotiating the second response interval, the control unit switches control of the network device from the primary controller to the secondary controller.

17. The network device of claim 16, wherein the management module, prior to the switch of control from the primary controller to the secondary controller and prior to negotiating the second response interval, applies the software upgrade to the secondary controller.

18. The network device of claim 16,
wherein the network device comprises a router, the primary controller comprises a first routing engine, and the secondary controller comprises a second routing engine,
wherein the control unit switches control by, prior to commencing the software upgrade within the first routing engine but after negotiating the second response interval, switching control of the router from the first routing engine to the second routing engine.

19. The network device of claim 10,
wherein the control unit comprises a primary controller and a secondary controller, and
wherein the management module dynamically computes the predicted upgrade time by dynamically computing the predicted upgrade time based on one or more of the following factors: (i) the size of the software upgrade and (ii) an estimated time necessary for the control unit to switch control from the primary controller to the secondary controller, wherein the estimated switchover time is either preconfigured by an administrator or set based on measurements taken from previous switchovers by the management module.

20. A non-transitory computer-readable medium comprising instructions for causing a programmable processor of a first network device to:
execute a bidirectional forwarding detection (BFD) protocol to negotiate with a second network device a first response interval by which the first network device need respond to a message sent by the second network device also in accordance with the protocol;
after executing the BFD protocol to negotiate with the second network device the first response interval, automatically detect initiation of a software upgrade within a controller of the first network device;
prior to commencing the software upgrade, dynamically compute a predicted upgrade time to complete the software upgrade with the first network device to determine whether the predicted upgrade time exceeds or equals the first response interval;
based on the determination and prior to commencing the software upgrade, execute the BFD protocol to negotiate with the second network device a second response interval by which the first network device need respond to a message sent by the second network device such that the second response interval equals or exceeds the predicted upgrade time; and
after initiating the software upgrade, execute the BFD protocol to negotiate with the second network device in accordance with the protocol a third response interval by which the first network device need respond to a message sent by the second network device such that the third response interval is shorter than the second response interval.

21. The non-transitory computer-readable medium of claim 20,
wherein the controller comprises a primary controller, and
wherein the instructions cause the processor to dynamically compute the predicted upgrade time by dynamically computing the predicted upgrade time based on one or more of the following factors: (i) the size of the software upgrade and (ii) an estimated time necessary for the first network device to switch control from the primary controller to a secondary controller included within the first network device, wherein the estimated switchover time is either preconfigured by an administrator or set based on measurements taken from previous switchovers.

22. The non-transitory computer-readable medium of claim 20, wherein the instructions cause the processor to execute the BFD protocol to negotiate with the second network device the second response interval by:
setting a state field within a control message to indicate an AdminDown state; and
transmitting the control message to the first network device prior to commencing the software upgrade within the controller.

23. The non-transitory computer-readable medium of claim 20,
wherein the controller comprises a primary controller, and
wherein the instructions cause the processor to further apply, prior to switching control of the first network device from the primary controller to a secondary controller of the first network device and prior to negotiating the second response interval, the software upgrade to the secondary controller of the first network device.

24. The non-transitory computer-readable medium of claim 20,
wherein the controller comprises a primary controller, and
wherein the instructions cause the processor to further:
receive with the first network device the message sent by the second network device in accordance with the protocol;
when the first response interval is negotiated, respond with the primary controller of the first network device to the message sent by the second network device within the first response interval in accordance with the protocol; and
when the second or third response interval is negotiated, respond with a secondary controller of the first network device to the message sent by the second network device within the applicable one of the second and third response intervals in accordance with the protocol.

25. A network device comprising:

a control unit comprising one or more processors that execute a protocol to negotiate with another network device a first response interval by which the network device need respond to a message sent by the other network device also in accordance with the same protocol, wherein the one or more processors further execute a management module that (i) after executing the protocol to negotiate with the second network device the first response interval, automatically detects initiation of an event processing function within the network device, wherein the event processing function comprises an event that disrupts the transfer of the message such that the second network device does not receive the message within the first response interval, and (ii) prior to commencing the event processing function, dynamically computes a predicted time to complete the event processing function to determine whether the predicted time exceeds or equals the first response interval, wherein, based on the determination and prior to commencing the even processing function, the one or more processors also execute the protocol to negotiate with the other network device a second response interval by which the second network device need respond to a message sent by the first network device such that the second response interval equals or exceeds the predicted time, and after initiating the event processing function, negotiate with the first network device a third response interval such that the third response interval is shorter than the second response interval.

* * * * *